United States Patent [19]

Willis et al.

[11] Patent Number: 4,755,020

[45] Date of Patent: Jul. 5, 1988

[54] GAS-BLOCKED OPTICAL FIBER CABLE UNIT

[75] Inventors: Frank R. Willis, South Holland; John D. Meyer, Western Springs, both of Ill.

[73] Assignee: Andrew Corporation, Orland Park, Ill.

[21] Appl. No.: 77,025

[22] Filed: Jul. 23, 1987

Related U.S. Application Data

[63] Continuation of Ser. No. 550,021, Nov. 8, 1983.

[51] Int. Cl.⁴ .......................... G02B 6/44; H01B 7/02; B01J 13/00; H02G 15/00
[52] U.S. Cl. .................... 350/96.23; 350/96.34; 174/25 G; 174/26 G; 174/70 R; 174/110 S; 174/118; 252/313.2; 252/315.6; 523/173; 524/847; 524/862
[58] Field of Search ............... 350/96.10, 96.23, 96.34; 524/790, 847, 862; 528/31; 174/19, 70 R, 20, 23 R, 24, 118, 25 G, 26 G, 110 S, 120 R, 120 C, 120 SR; 252/9, 11, 12, 12.2, 20, 21, 313.5, 313.6, 313.2; 523/173

[56] References Cited

U.S. PATENT DOCUMENTS

| 4,162,243 | 7/1979 | Lee et al. ...................... 260/375 B |
| 4,312,565 | 1/1982 | Oestreich et al. ................ 350/96.23 |
| 4,331,379 | 5/1982 | Oestreich et al. ................ 350/96.23 |
| 4,461,736 | 7/1984 | Takagi ............................. 174/23 R |
| 4,463,118 | 7/1984 | Evans et al. ...................... 524/264 |
| 4,684,213 | 8/1987 | Ishihara et al. ................. 350/96.23 |
| 4,701,016 | 10/1987 | Gartside, III et al. ........... 350/96.23 |
| 4,711,523 | 12/1987 | Iri et al. ......................... 350/96.23 |
| 4,720,164 | 1/1988 | Oestreich ........................ 350/96.23 |

FOREIGN PATENT DOCUMENTS

| 55-163503 | 12/1980 | Japan ............................. 350/96.23 |
| 1302919 | 1/1973 | United Kingdom ............ 252/315.6 |

OTHER PUBLICATIONS

Schue, "Colloidal Silicas", Detergents and Specialties, vol. 6, No. 3, 3/69, pp. CT 18–24.

*Primary Examiner*—William L. Sikes
*Assistant Examiner*—Brian M. Healy
*Attorney, Agent, or Firm*—Stephen G. Rudisill

[57] ABSTRACT

An optical fiber cable unit in which an elongated optical fiber is telescoped into an outer jacket such that an annular space is defined between the fiber and the jacket. The space is filled with a polyorganosiloxane "grease" having extremely good thixotropic properties which cause the material to establish a gas-tight seal between the fiber and the jacket while allowing the fiber to float freely within the jacket to avoid elongation of the fiber when tension is applied to the cable.

2 Claims, 1 Drawing Sheet

GAS-BLOCKED OPTICAL FIBER CABLE UNIT

This is a continuation of co-pending application Ser. No. 550,021 filed on Nov. 8, 1983.

BACKGROUND OF THE INVENTION

This invention relates to optical fiber units for use in an optical fiber cable.

An optical fiber cable usually comprises a plurality of elongated optical fiber units wound spirally within an outer sheath. Each unit comprises an optical fiber telescoped within and spaced inwardly from an outer tubular jacket so that an annular space is defined between the fiber and the jacket.

In some applications, the cable is exposed to high-pressure hazardous gases which must be blocked against progressing through the interior of the cable. For example, United States Department of Energy specifications for certain optical fiber cables require that the cable be capable of blocking flow at end pressures as high as 125 p.s.i. In part, gas blockage is achieved by filling the annular space between the fiber and jacket of each optical fiber unit with a material which establishes a pressure-tight seal between the fiber and the jacket.

Previous materials which have been used as fillers include non-silicone materials such as polyurethane jelly, photo-curable polymers, semi-liquid organic polymers, and a material sold under the trade designator "INDOPOL". Difficulty has been encountered with those materials in that prior materials which are sufficiently viscous to block flow at the specified gas pressure excessively restrict free movement of the fiber in the jacket and thus cause undesirable changes in certain optical properties of the fiber when tension is applied to the cable. On the other hand, those prior materials with a relatively low viscosity enabling substantially free movement of the fiber are not capable of resisting high gas pressures when such materials are used to fill an annular space of sufficiently large cross-sectional area to impart desired properties to the fiber unit. Moreover, the viscosity of the previously used materials changes significantly over the wide temperature ranges to which the fiber unit may be exposed, such materials typically becoming excessively stiff at low temperatures and excessively fluid at high temperatures.

SUMMARY OF THE INVENTION

The general aim of the present invention is to provide a new and improved optical fiber cable unit having a sealing filler which not only is virtually unaffected by temperature changes but which also possesses extremely good thixotropic characteristics enabling the filler to remain stable when subjected to compressive gas pressure but to be disturbed easily in shear when tension is applied to the fiber so as to enable the fiber to readily re-position itself in the jacket and thereby avoid placing excessive strain on the fiber.

DETAILED DESCRIPTION OF THE PREFERRED EMBODIMENT

Figure 1:
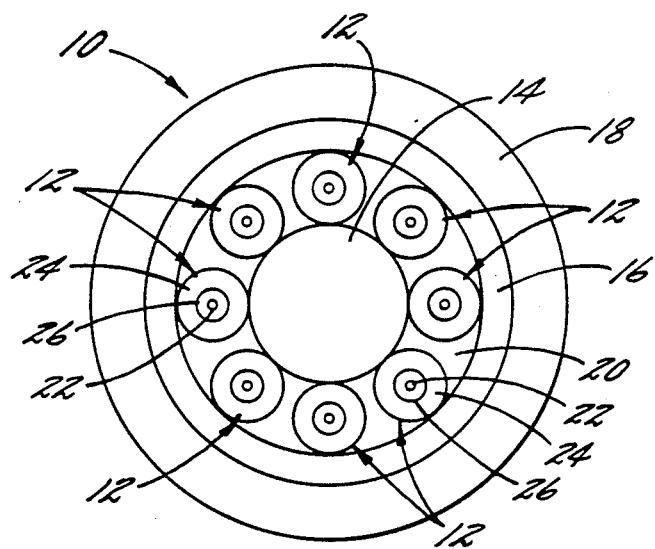
FIG. 1 is a cross-sectional view on a greatly enlarged scale taken radially through an optical fiber cable having new and improved optical fiber units incorporating the unique features of the present invention.
Figure 2:
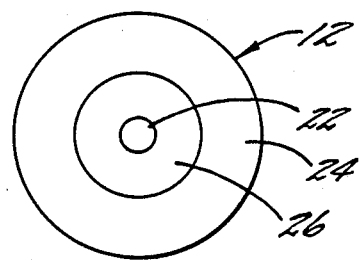
FIG. 2 is an enlarged radial cross-section of one of the optical fiber units of the cable shown in FIG. 1.

For purposes of illustration, the present invention is shown in the drawings in connection with an elongated optical fiber cable 10 for telemetering data from a region which may contain biologically hazardous gases. The present cable comprises several (herein, eight) elongated optical fiber units 12 wound spirally around a central support member 14 which may be in the form of a glass fiber/polyester resin rod. Encasing the optical fiber units are two coaxial polyethylene sheaths 16 and 18, the inner sheath 16 being black for opacity and the other sheath 18 being of a distinctive identifying color such as orange. The interstices between the optical fiber units 12, the central supporting rod 14 and the inner sheath 16 are filled with an adhesive material 20 which binds the components together to form the unitary cable 10.

Each of the optical fiber units 12 comprises an elongated strand of optical fiber 22 telescoped within an outer tube or jacket 24 made of nylon or the like. The fiber is spaced inwardly from the wall of the jacket and thus an annular space is defined between the two. Typically, the fiber describes a helical course within the jacket and is permitted to float radially in the jacket to enable strain on the fiber to be relieved when the cable 10 is placed under tension.

The annular space between the fiber 22 and the jacket 24 of each fiber unit 12 is filled with a fluid-like material 26 which permits the fiber to float in the jacket. When the cable 10 is used in an environment containing hazardous gases, the filler 26 also must act as a seal between the fiber and the jacket in order to prevent the gases from flowing axially through the fiber unit. In certain applications, the filler must seal against pressures as high as 125 p.s.i. at one end of the cable.

In accordance with the present invention, the filler 26 which is used in each fiber unit 12 possesses special thixotropic properties which enable the filler to resist and seal against relatively high gas pressures while still permitting the fiber 22 to float freely in the jacket 24 to avoid straining the fiber. In addition, the thixotropic properties of the filler 26 are virtually insensitive to temperature changes and thus the filler remains effective over wide temperature ranges.

The material which is used herein as the filler 26 may be classified broadly as a polyorganosiloxane fluid. The preferred material is that identified as Part A of a two-part mixture sold by Dow Corning Corporation of Midland, Mich. under the trade designator SILASTIC 595. Basically, that material is a polydimethylsiloxane fluid which is modified to improve greatly its thixotropic properties. Such a material is disclosed in Lee et al., U.S. Pat. No. 4,162,243, the disclosure of which is specifically incorporated herein by reference. The material which is used as the filler 26 corresponds to a mixture of the materials set forth as material (A) and material (B) in claim 1 of the Lee et al. patent, namely, a mixture which is:

(A) 100 parts by weight of a triorganosiloxy end-blocked polydimethylsiloxane fluid in which the triorganoxiloxy units are selected from the group consisting of dimethylvinylsiloxy and methylphenylvinylsiloxy, said fluid being a mixture of polymeric species of varying molecular weight where each species is present in an amount sufficient to collectively provide a molecular weight distribution such that there is present at least one polymeric species (1) at a concentration greater than the concentrations of adjacent polymeric species of lower and higher molecular weight where polymeric species (1) is identified as a peak molecular weight as determined by gel permeation chromatographic analysis and there being a peak molecular weight of polymeric species in the range of from 68,000 to 135,000 at a major concentration, in said fluid the molecular weight of the lowest molecular weight polymeric species being in the range of from 854 to 3146 and the molecular weight of the highest molecular weight species being in the range of from 174,000 to 370,000, the mixture of polymeric species having a molecular weight distribution such that a dispersity index has a value greater than 3.8, and (B) from 20 to 60 part by weight of a reinforcing amorphous silica having a surface area of greater than 100 square meters per gram, the surface of the silica having silicon atoms to which are bonded organosiloxane groups selected from the group consisting of

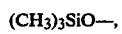 (a)

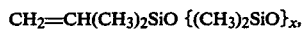 (b)

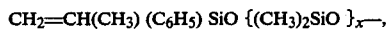 (c)

and

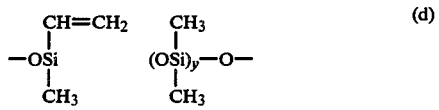 (d)

in which x is an integer of 0 to 20 and y is an integer of 1 to 5, the organosiloxane groups being present in an amount such that there is from 0.05 to 0.32 percent by weight vinyl based on the weight of the silica and the organosiloxane groups being present in a mole ratio such that there is from 7 to 50 moles of (a) for each mole of (b), (c), (d) or mixtures thereof.

The preferred filler 26 has the appearance and rheology of a soft grease. Its consistency is virtually unchanged through a temperature range of $-40°$ C. to $+100°$ C. Under a very low shear force, the material will not move, that is, it will not level itself if stirred, and a small quantity of the material will not pour out of an inverted container. A small increase in the shear force, however, effects easy disturbance of the material.

These characteristics of the material 26 are used to advantage as a filler in an optical fiber unit. When the material is so used, gas pressure present at one end of the jacket 24 is distributed along the length of the jacket so that the force tending to push the filler out of the jacket is lowered to a level where the filler will not move and will maintain a pressure-tight seal between the jacket and the fiber 22. If a disturbing force is applied to the fiber, however, such force easily overcomes the slight resistance to shear offered by the filler so that the filler allows the fiber to float and re-position itself in the jacket to relieve the strain.

Tests have demonstrated that, with a ten meter cable 10 having fiber units 12 incorporating the filler 26 of the invention and having jackets 24 with an inside diameter of 0.046", ±0.001", there is virtually no change in the length of the fiber 22 for cable tensions up to 700 pounds where the fiber units were wound under an initial tension of 2.5 oz. Also, if a higher load is imposed to stetch the fiber, the fiber recovers to its original neutral state immediately upon removal of the load.

Accordingly, the filler 26 allows the fiber 22 of each unit 12 to float sufficiently in the jacket 25 to avoid elongation of the fiber under the tensile loads to which the cable 10 is subjected during service use. Optical properties such as signal time delay, attenuation, bandwidth and numerical aperture are not affected by cable tensions which do not change the cable length and thus the filler 26 enables these properties to be maintained at designated requirements. At the same time, the filler is capable of maintaining a pressure-tight seal when one end of the cable is exposed to a gas pressure as high as 125 p.s.i.

We claim as our invention:

1. A gas-blocked optical fiber cable unit comprising an elongated tubular jacket, an elongated optical fiber telescoped into and spaced inwardly from said jacket whereby the region between said jacket and said fiber defines an annular space through which pressurized gas may flow, and a filler disposed within said space and blocking the flow of said pressurized gas through said space while allowing said fiber to reposition itself in said jacket, said cable unit being characterized in that said filler consists essentially of a mixture of (i) polydimethylsiloxane fluid having a non-grease-like rheology, and (ii) reinforcing amorphous silica, wherein said silica modifies said fluid so as to present a grease-like rheology and improves the thixotropic properties thereof, the combination of said fluid and said silica displaying a consistency which remains substantially unchanged over a temperature range of about $-40°$ to $+100°$ C.

2. A gas-blocked optical fiber cable unit comprising an elongated tubular jacket, an elongated optical fiber telescoped into and spaced inwardly from said jacket whereby the region between said jacket and said fiber defines an annular space through which pressurized gas may flow, and a filler disposed within said space and blocking the flow of said pressurized gas through said space while allowing said fiber to reposition itself in said jacket, said cable unit being characterized in that said filler comprises a mixture which is:

(A) 100 parts by weight of a triorganosiloxy end-blocked polydimethylsiloxane fluid in which the triorganosiloxy units are selected from the group consisting of dimethylvinylsiloxy and methylphenylvinylsiloxy, said fluid being a mixture of polymeric species of varying molecular weight where each species is present in an amount sufficient to collectively provide a molecular weight distribution such that there is present at least one polymeric species (1) at a concentration greater than the concentrations of adjacent polymeric species of lower and higher molecular weight where polymeric species (1) is identified as a peak molecular weight as determined by gel permeation chromatographic analysis and there being a peak molecular weight of polymeric species in the range of from 68,000 to 135,000 at a major concentration, in said fluid the molecular weight of the lowest molecular weight polymeric species being in the range of from 854 to 3146 and the molecular weight of the highest molecular weight species being in the range of from 174,000 to 370,000, the mixture of polymeric species having a molecular weight distribution such that a dispersity index has a value greater than 3.8, and (B) from 20 to 60 parts by weight of a reinforcing amorphous silica having a surface area of greater than 100 square meters per gram, the surface of the silica having silicon atoms to which are bonded organosiloxane groups selected from the group consisting of $(CH_3)_3SiO-$,  (a)

$CH_2=CH(CH_3)_2SiO\{(CH_3)_2SiO\}_x-$,  (b)

$CH_2=CH(CH_3)(C_6H_5)SiO\{(CH_3)_2SiO\}_x-$,  (c)

and

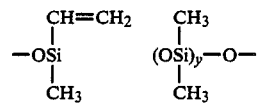

in which x is an integer of 0 to 20 and y is an integer of 1 to 5, the organosiloxane groups being present in an amount such that there is from 0.05 to 0.32 percent by weight vinyl based on the weight of the silica and the organosiloxane groups being present in a mole ratio such that there is from 7 to 50 moles of (a) for each mole of (b), (c), (d) or mixtures thereof.

* * * * *